Figure 1:
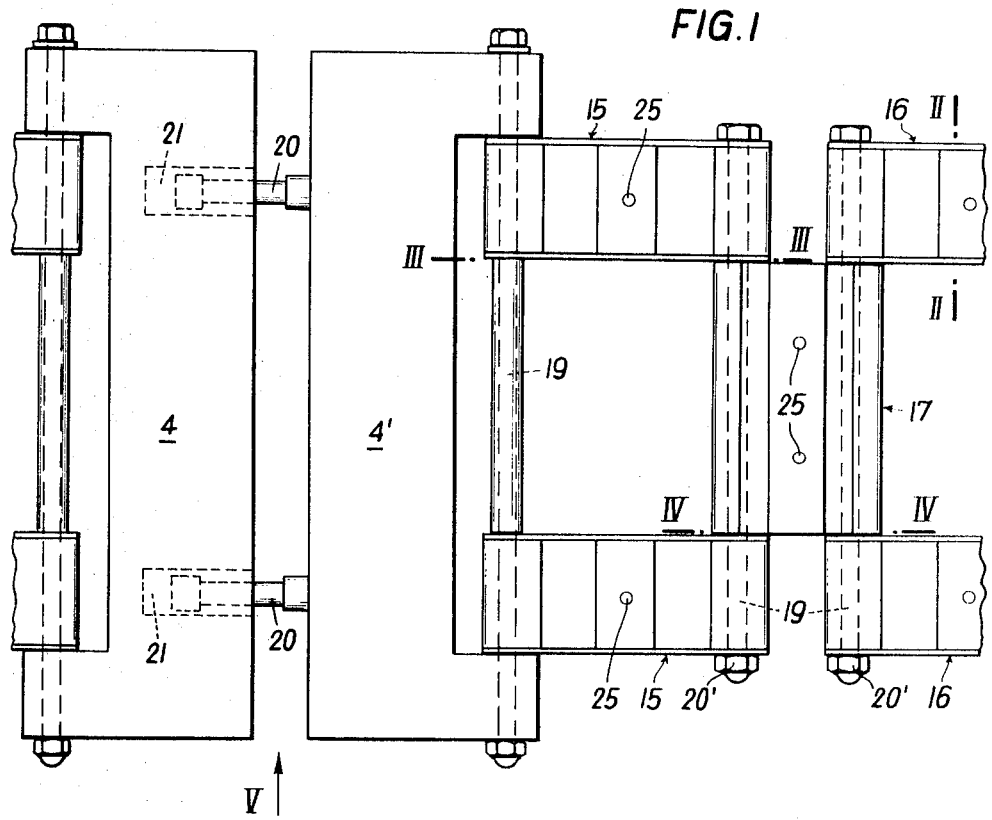

United States Patent

[11] 3,595,294

| [72] | Inventor | Albert Strelli |
| | | Rebengasse 19, Graz, Steiermark, Austria |
| [21] | Appl. No. | 827,618 |
| [22] | Filed | May 26, 1969 |
| [45] | Patented | July 27, 1971 |
| [32] | Priority | May 31, 1968 |
| [33] | | Austria |
| [31] | | A 5257/68 |

[54] NONSKID DEVICE FOR VEHICLE TIRES
5 Claims, 9 Drawing Figs.

| [52] | U.S. Cl. | 152/225 |
| [51] | Int. Cl. | B60c 27/20 |
| [50] | Field of Search | 152/225, 226 |

[56] References Cited
UNITED STATES PATENTS

| 2,917,095 | 12/1959 | Galanot | 152/225 |
| 2,936,807 | 5/1960 | Hajart | 152/225 |

*Primary Examiner*—James B. Marbert
*Attorney*—Karl F. Ross

ABSTRACT: The invention provides a nonskid device which extends around the entire periphery of a vehicle wheel and can easily be adapted to vehicle tires having different circumferential dimensions. To this end, nonskid elements of the nonskid device according to the invention are carried by pairs of chain side bars and adjacent ones of said pairs are connected by coupling members.

PATENTED JUL 27 1971 3,595,294

SHEET 1 OF 3

ALBERT STRELLI
INVENTOR.

BY
*Karl F. Ross*
ATTORNEY

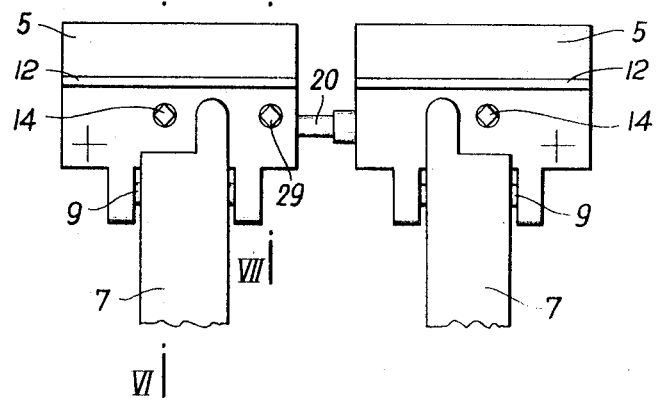
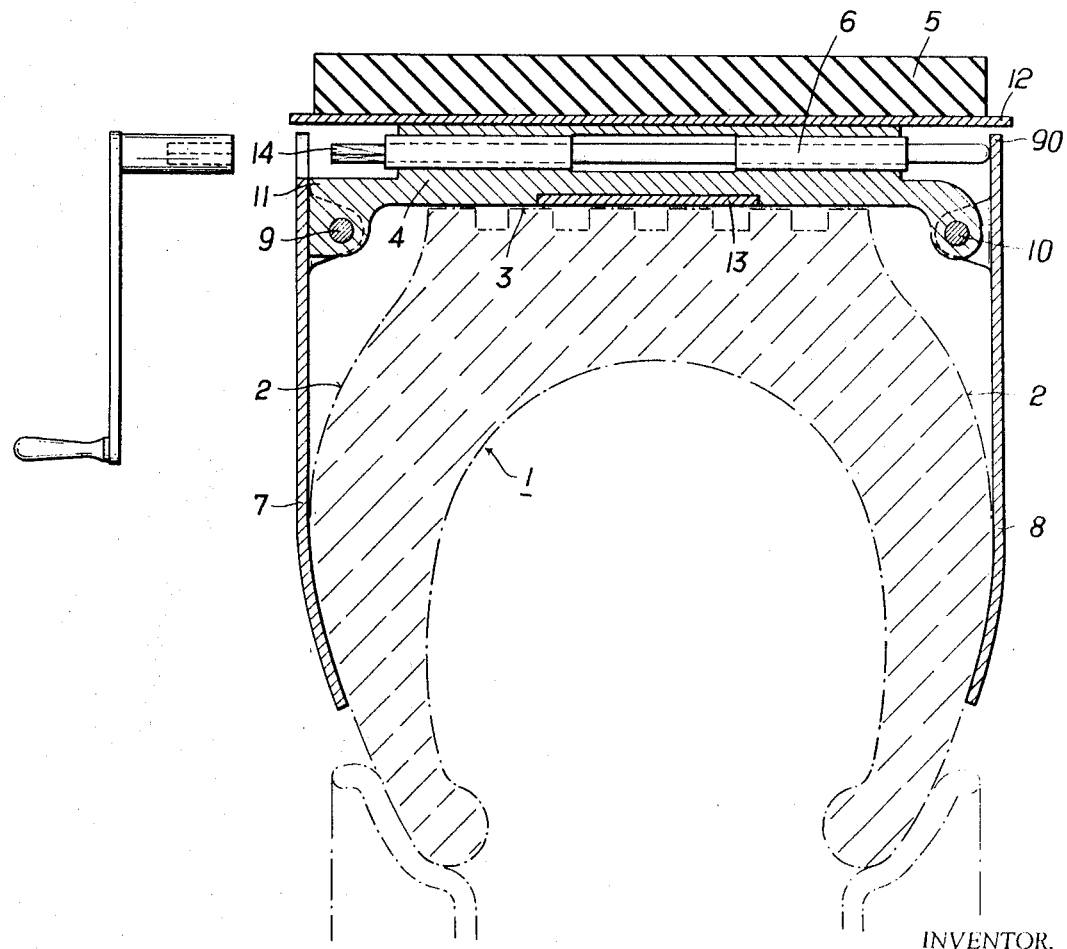

NONSKID DEVICE FOR VEHICLE TIRES

This invention relates to a nonskid device for vehicle tires, which device comprises nonskid elements mounted on carriers.

It is an object of the invention to provide a nonskid device which can easily be adapted to vehicle tires of different sizes.

This object is accomplished according to the invention in that the carriers for the nonskid elements form pairs of chain side bars and adjacent pairs are connected by coupling members, which may also carry nonskid elements.

Hence, the nonskid device according to the invention consists of individual elements, which can be connected in series in any desired number to form chains of any desired length. The dimensions of the coupling members can be changed so that the nonskid device according to the invention can be adjusted to vehicle tires which differ in width.

It is particularly desirable in a development of the invention if the side bars are connected to the coupling members by bolts and a nut, preferably a capnut, is adapted to be screwed onto at least one end of the bolts. In this case it is sufficient simply to loosen the capnut and to remove or insert side bars and coupling members so that the nonskid device can be increased or decreased in length.

In a development of the invention, a plurality of pairs of side bars are combined in a segment and the pair of side bars disposed at one end of the segment have connected to them one part of a two-part fastener, which part comprises at least one fastening hook, whereas the other part of the fastener is connected to the pair of side bars disposed at the other end of the segment, said other part is formed with openings for slidably receiving the fastening hook of the adjacent segment, a locking pin which is slidable transversely to the openings is mounted in that part of the fastener which comprises the openings for receiving the fastening hook and said pin in one position partly overlaps the cross section of the opening for receiving the fastening hook. Nonskid devices differing in length may also be obtained in that a plurality of segments are connected in series by simple fasteners.

The nonskid device can easily be mounted on the vehicle tire if, in a further development of the invention, each fastener part is provided with two jaws, which are adapted to be forced against the sidewalls of the tire with the aid of a screw, which is mounted in the fastener part and extends across the tread of the tire, at least one of said jaws is pivoted about a pivot which is mounted on the fastener part and said one jaw has in known manner an extension which is engageable with the screw at a point which is spaced from the pivot.

Figure 2:
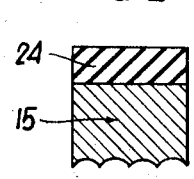
Figure 3:
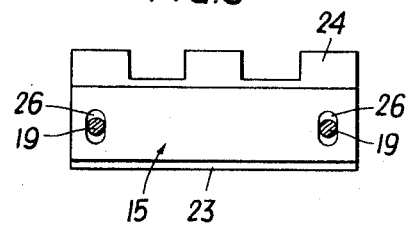
Figure 4:
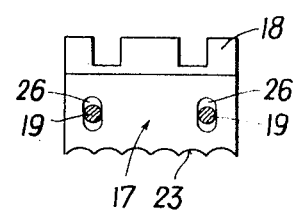
Figure 7:
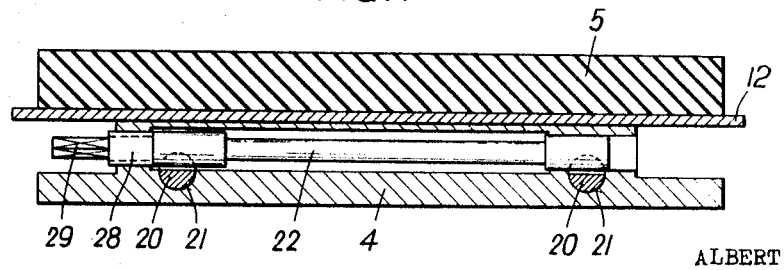
Figure 8:
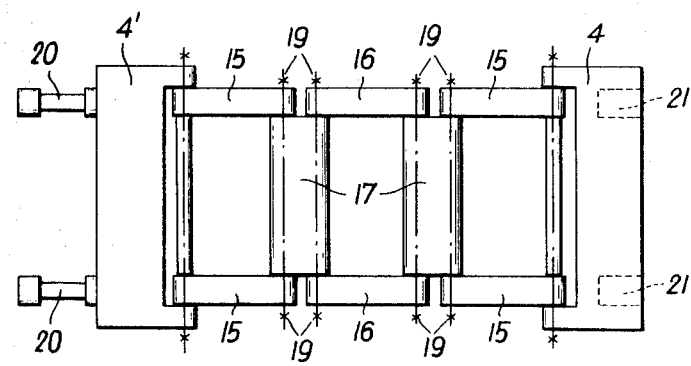
Figure 9:
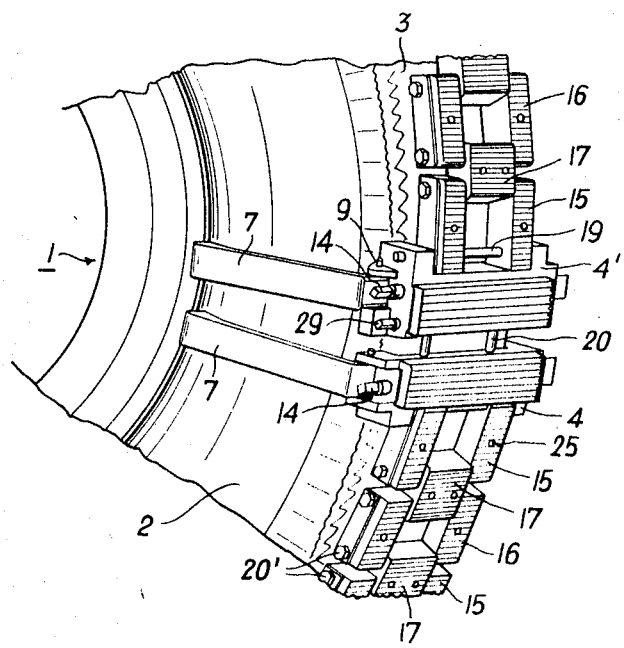

The invention will now be explained more fully with reference to the accompanying drawing, in which FIG. 1 is a top plan view showing the nonskid device according to the invention, FIG. 2 is a sectional view taken on line II–II in FIG. 1, FIG. 3 is a sectional view taken on line III–III in FIG. 1, FIG. 4 is a sectional view taken on line IV–IV in FIG. 1, FIG. 5 is a side elevation taken in the direction of the arrow V in FIG. 1, FIG. 6 is a sectional view taken on line VI–VI in FIG. 5, FIG. 7 is a sectional view taken on line VII–VII in FIG. 5, FIG. 8 is a top plan view showing a segment consisting of a plurality of pairs of side bars and coupling members and FIG. 9 is a perspective view showing a nonskid device which is mounted on a pneumatic tire for a vehicle.

The drawing shows pairs of side bars 15 and 16, which carry nonskid elements. Adjacent pairs are connected by coupling members 17, which may be provided with nonskid elements 18, as is shown more fully in FIG. 4. The underside of the coupling member 17 may be provided with grooves 23, which extend across the tread 3 of the vehicle tire on which the nonskid device is mounted. The grooves serve to increase the friction between the tread 3 of the vehicle tire 1 and the coupling members 17.

As is apparent from FIG. 1, each coupling member 17 extends between the side bars of a pair of side bars 15, 16 and holds these side bars spaced apart. The side bars 15, 16 are also provided with nonskid elements 24, which may be secured to the side bars 15, 16, e.g. by vulcanizing. Additionally studs or spikes may be provided in the coupling members 17 and in the side bars 15 and 16, as is more fully apparent from the top plan view shown in FIG. 1. The spikes are designated 25 in these figures.

The side bars 15 and 16 are connected to the coupling members 17 by bolts 19. A nut is adapted to be screwed on the bolt at least at one end of the latter and may consist, e.g., of a capnut 20'. The bolts 19 are adapted to extend through slots 26 in the side bars 15 and 16 and through slots 27 in the coupling members 17. These slots enable a certain movement of the side bars 15 and 16 and coupling members 17 relative to the bolts 19 and thus facilitate the adaptation of the nonskid device to the respective vehicle tire.

A plurality of pairs of side bars 15 and 16 may be combined in a segment, as is illustrated in FIG. 8. A fastener consists of two parts 4, 4', one of which, 4', is connected to the pair of side bars disposed at one end of the segment and has at least one fastening hook 20. The second part 4 of the fastener 4, 4' is connected to the pair of side bars disposed at the other end of the segment and provided with openings 21 for slidably receiving the fastening hook 20 of the adjacent segment. To lock the fastening hook 20 in the fastener part 4, the latter part, which is formed with the openings 21 for receiving the fastening hook 20, is provided with a locking pin 22, which is slidable transversely to the openings 21 and assumes a position in which it partly overlaps the cross section of the opening 21 serving to receive the fastening hook 20. This is clearly apparent from FIG. 7. The locking pin 22 is adapted to be screwed into the fastener part 4 by means of a screw thread 28 and has at one of its ends a square portion 29, which is engageable by a wrench, which serves to displace the locking pin 22 in the fastener part 4. A plurality of segments may be connected in series, as is shown in FIG. 8, to form nonskid devices of any desired length. These devices can be mounted on vehicle wheels having different circumferential dimensions.

To enable a fixation of the nonskid devices on the vehicle tire 1, each fastener part 4, 4' is provided with two jaws 7 and 8, which are adapted to be forced against the sidewalls 2 of the tire 1 by means of a screw 6, which is mounted in the fastener part 4, 4' and extends across the tread 3 of the tire 1. At least one of these jaws, namely, the jaw 8, and preferably each of these jaws 7 and 8, is pivoted on a pivot 10, which is mounted on the fastener part. The jaw 8 has an extension 90, which is engageable with the screw 6 at a point which is spaced from the pivot 10. That jaw 7 which is not engageable with the screw 6 has an extension which is engageable with an abutment 11 provided on the fastener part 4 or 4' to limit the pivotal movement in the unclamping direction. The fastener part 4 or 4' is provided with a cover plate 12, which is provided in turn with nonskid elements 5 and adapted to be secured by screws to the fastener part 4 or 4'. At one end of the screw 6, the latter has a square portion 14, which is receivable by a square socket wrench that is operable to fix the nonskid device on a vehicle tire 1.

I claim:

1. A nonskid device for use with a vehicle tire, comprising an antiskid chain provided with nonskid elements and having a plurality of pairs of transversely spaced side bars spaced along the periphery of the tire, and coupling members hinged to the successive pairs of side bars; and at least one pair of fastener members interconnecting adjacent portions of said chain, said fastener members comprising a first fastener member provided with a locking hook extending in the direction of the periphery of the tire, and a second fastener member formed with an elongated passage opening in the direction of said first fastener member for receiving said locking hook; and a pin removably extending through said second fastener member transversely of the periphery of said tire and partly obstructing the cross section of said passage to prevent withdrawal of said hook.

2. The nonskid device defined in claim 1 wherein each of said coupling members is received between a pair of said side bars at each end of the coupling member to space said side bars apart, the antiskid chain further comprising a respective end-threaded bolt extending through the side bars of each pair and the respective connecting member to form a pintle hingedly interconnecting the respective pair of side bars and the connecting member, and a capnut threaded onto an end of each of said bolts.

3. The nonskid device defined in claim 2 wherein at least one of said fastener members is provided with a pair of jaws hingedly mounted thereon and flanking the sidewalls of said tire, said one of said fastener members being further provided with means for urging said jaws against the sidewalls of said tire.

4. The nonskid device defined in claim 3 wherein each of said jaws has a projection extending beyond the respective pivot in an outward direction with respect to the center of the tire and the last-mentioned means includes at least one screw threaded onto said one of said fastener members and engageable with a respective projection on one of said jaws for urging same into clamping engagement with the respective sidewall, the projection of the other of said jaws being engageable with an abutment portion of said one of said fastener members.

5. The nonskid device defined in claim 4 further comprising a cover plate on said one of said fastener members and provided with a respective nonskid element.